(12) United States Patent
Wortmann

(10) Patent No.: US 7,574,943 B2
(45) Date of Patent: Aug. 18, 2009

(54)[1] PARKING BRAKE ACTUATOR WITH CLUTCH SPRING ASSEMBLY

(75) Inventor: Martin Joseph Wortmann, Huntsville, MO (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 890 days.

(21) Appl. No.: 11/142,022

(22) Filed: Jun. 1, 2005

(65) Prior Publication Data

US 2006/0272445 A1 Dec. 7, 2006

(51) Int. Cl.
*G05G 1/14* (2006.01)

(52) U.S. Cl. .............................. 74/512; 74/513; 74/517; 74/528; 74/575; 188/2 D

(58) Field of Classification Search ........... 74/512–514, 74/517, 575, 528, 560, 540, 541; 188/2 D; *G05G 1/14*
See application file for complete search history.

(56) References Cited

U.S. PATENT DOCUMENTS

| | | | |
|---|---|---|---|
| 3,333,512 A | 8/1967 | Parsons | |
| 4,612,823 A * | 9/1986 | De Leeuw et al. ............ | 74/533 |
| 4,850,242 A | 7/1989 | Hass et al. | |
| 5,182,963 A * | 2/1993 | Perisho et al. ................ | 74/512 |
| 5,309,786 A | 5/1994 | Paré et al. | |
| 5,448,928 A | 9/1995 | Harger | |
| 5,467,666 A | 11/1995 | Soucie et al. | |
| 5,477,746 A | 12/1995 | Perisho et al. | |
| 5,528,956 A * | 6/1996 | Harger et al. ................. | 74/517 |
| 5,533,420 A | 7/1996 | Perisho | |
| 5,611,249 A | 3/1997 | Perisho et al. | |
| 5,758,547 A * | 6/1998 | Smale .......................... | 74/516 |
| 5,794,492 A | 8/1998 | Paré | |
| 5,832,784 A * | 11/1998 | McCallips et al. ............ | 74/512 |
| 5,875,688 A | 3/1999 | Porter et al. | |
| 7,051,614 B2 * | 5/2006 | Podkopayev .................. | 74/512 |
| 2008/0041689 A1 * | 2/2008 | Hanna et al. ............. | 192/219.5 |

OTHER PUBLICATIONS

International Search Report for PCT/GB2006/050306.
European Search Report for EP 06252812.

* cited by examiner

*Primary Examiner*—Vinh T. Luong
(74) *Attorney, Agent, or Firm*—Banner & Witcoff, Ltd.; Gregory J. Cohan; Dean B. Watson

(57) ABSTRACT

A parking brake actuator includes a mounting bracket, a cover plate. A brake operating assembly includes a lever and a locking sector gear. A locking clutch spring assembly includes a pinion rivet, a shaft, a flange, first and second tubular portions and a pinion with a plurality of teeth. A torsion spring is wrapped about the first tubular portion and the pinion. A first leg of a release spring abuts a first arm of a release lever. A release cable is connected to a second arm of the release lever. A brake cable is connected to an adjusting sector gear, which is engageable with an adjusting clutch spring assembly.

17 Claims, 2 Drawing Sheets

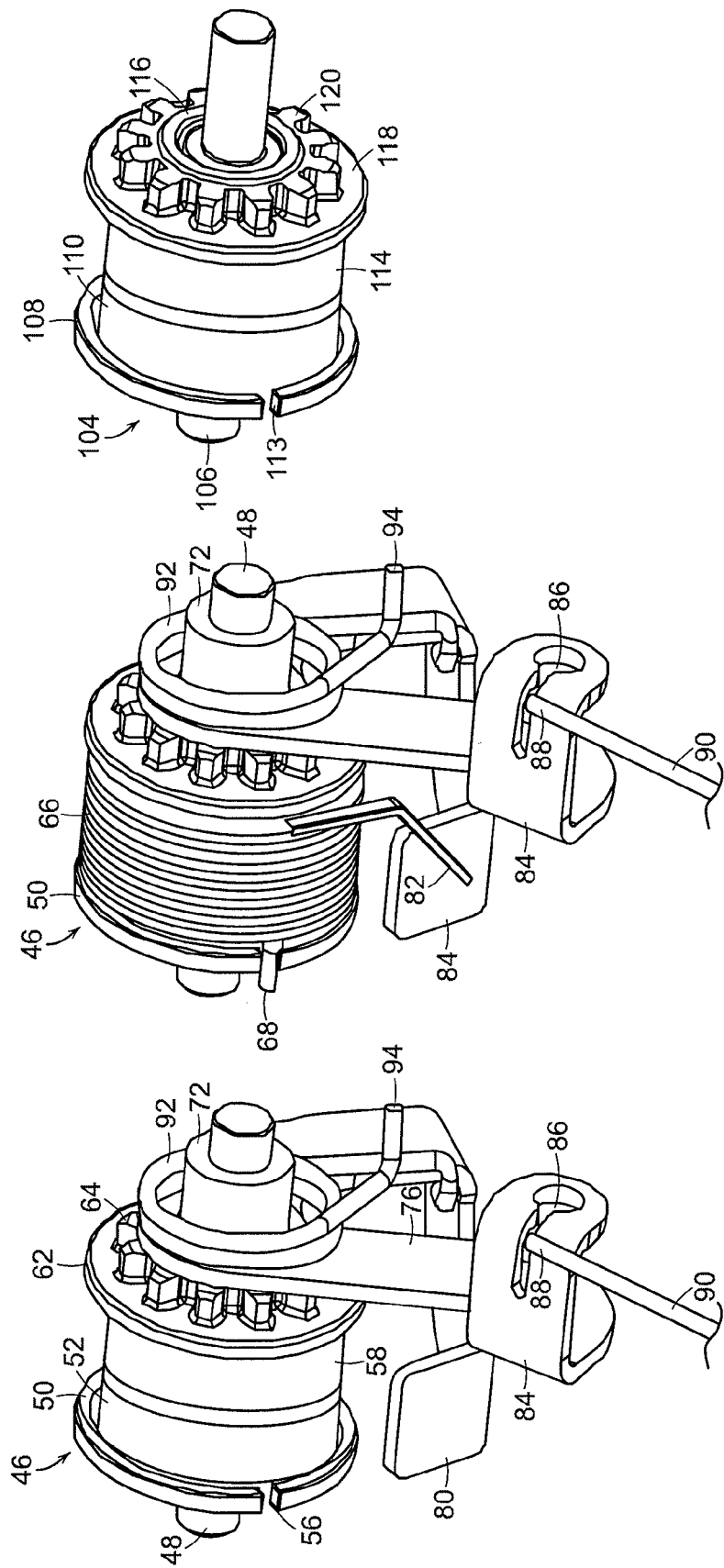

PARKING BRAKE ACTUATOR WITH CLUTCH SPRING ASSEMBLY

FIELD OF THE INVENTION

This invention relates generally to a parking brake actuator, and, in particular, to a parking brake actuator with an improved clutch spring assembly.

BACKGROUND OF THE INVENTION

Motor vehicle parking brake actuators are well known and may include a lever that serves to cause rotation of a locking sector gear, which maintains a brake lever in an engaged position. An adjusting sector gear serves to create tension in a brake cable to apply the parking brake as well as provide for adjustment of slack in the brake cable. Clutch spring assemblies are often used with the locking sector gear and adjusting sector gear to releasably lock them in desired positions.

It is an object of the present invention would be desirable to provide a parking brake actuator with a clutch spring assembly that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide a parking brake actuator with fewer parts and improved operation of a clutch spring assembly. In accordance with a first aspect, a motor vehicle parking brake actuator includes a mounting bracket and a cover plate. A brake operating assembly positioned between the mounting bracket and cover plate includes a lever and a locking sector gear rotatably secured to the lever. A first clutch spring assembly is engageable with the locking sector gear and has a pinion rivet with a shaft, a flange on the shaft, a first tubular portion adjacent the flange, and a second tubular portion adjacent the first tubular portion and having a diameter smaller than a diameter of the first tubular portion. A pinion has an aperture formed therein and is seated on the second tubular portion of the pinion rivet in abutting relationship with the first tubular portion of the pinion rivet. A plurality of teeth are formed on the pinion. A torsion spring is wrapped about the first tubular portion and the pinion. A release lever has a first arm, a second arm and an aperture extending therethrough, with the aperture receiving a portion of the shaft of the pinion rivet. A release spring has a first leg and a second leg and is positioned about the shaft of the pinion rivet, with the first leg abutting the first arm of the release lever and the second leg connected to the cover plate. A release cable is connected to the second arm of the release lever. A brake cable is connected at one end thereof to an adjusting sector gear. An adjusting clutch spring assembly is engageable with the adjusting sector gear.

In accordance with another aspect, a motor vehicle parking brake actuator includes a mounting bracket, a cover plate, and a pin extending between the mounting bracket and the cover plate. A brake operating assembly is pivotable about the pin between the mounting bracket and cover plate and includes a lever and a locking sector gear rotatably secured to the lever. A first clutch spring assembly is engageable with the locking sector gear and includes a pinion rivet having a shaft, a flange on the shaft, a first tubular portion adjacent the flange and a second tubular portion adjacent the first tubular portion and having a diameter smaller than a diameter of the first tubular portion. A pinion has an aperture formed therein and is seated on the second tubular portion of the pinion rivet in abutting relationship with the first tubular portion of the pinion rivet. A plurality of teeth is formed on the pinion. A torsion spring is wrapped about the first tubular portion and the pinion. A release lever has a first arm, a second arm and an aperture extending therethrough, with the aperture receiving a portion of the shaft of the pinion rivet. A release spring has a first leg and a second leg and is positioned about the shaft of the pinion rivet, with the first leg abutting the first arm of the release lever and the second leg connected to the cover plate. A release cable is connected to the second arm of the release lever. An adjusting sector gear is connected to the lever and a brake cable is connected at one end thereof to the adjusting sector gear. A cable track is secured to the adjusting sector gear and has a camming surface, with the brake cable riding along the camming surface. An adjusting clutch spring assembly is engageable with the adjusting sector gear.

In accordance with a further aspect, a motor vehicle parking brake actuator includes a mounting bracket, a cover plate, and a pin extending between the mounting bracket and the cover plate. A brake operating assembly is positioned between the mounting bracket and cover plate and includes a lever with a pedal. A locking sector gear is rotatably secured to the lever and has a plurality of teeth. A first clutch spring assembly is engageable with the locking sector gear and includes a pinion rivet having a shaft, a flange on the shaft, a first tubular portion adjacent the flange, and a second tubular portion adjacent the first tubular portion and having a diameter smaller than a diameter of the first tubular portion. A pinion has an aperture formed therein and is seated on the second tubular portion of the pinion rivet in abutting relationship with the first tubular portion of the pinion rivet. A plurality of teeth on the pinion is engageable with the teeth of the locking sector gear. A torsion spring is wrapped about the first tubular portion and the pinion. A release lever has a first arm, a second arm and an aperture extending therethrough, with the aperture receiving a portion of the shaft of the pinion rivet. A release spring has a first leg and a second leg and is positioned about the shaft of the pinion rivet, with the first leg abutting the first arm of the release lever and the second leg connected to the cover plate. A release cable is connected to the second arm of the release lever. An adjusting sector gear is connected to the lever and has a slot formed therein, a tab, and a plurality of teeth. A first end of a brake cable is received in the slot in the adjusting sector gear. A cable track is secured to the adjusting sector gear and has a camming surface, with the brake cable riding along the camming surface. A clock spring has a first end engageable with the tab on the adjusting sector gear and a second end engaged with the cable track. An adjusting clutch spring assembly is engageable with the adjusting sector gear and includes a pinion rivet having a shaft, a flange on the shaft, a first tubular portion adjacent the flange, and a second tubular portion adjacent the first tubular portion and having a diameter smaller than a diameter of the first tubular portion. A pinion has an aperture formed therein and is seated on the second tubular portion of the pinion rivet in abutting relationship with the first tubular portion of the pinion rivet. A plurality of teeth on the pinion is engageable with the teeth of the adjusting sector gear. A torsion spring is wrapped about the first tubular portion and the pinion.

Substantial advantage is achieved by providing a parking brake actuator with an improved clutch spring assembly. In particular, certain embodiments provide improved holding of load while using fewer parts, resulting in lower costs and improved manufacturability.

These and additional features and advantages disclosed here will be further understood from the following detailed disclosure of certain embodiments.

BRIEF DESCRIPTION OF THE DRAWINGS

FIG. 2 is a perspective view of a locking clutch spring assembly of the parking brake actuator of FIG. 1, shown partially assembled.

FIG. 3 is a perspective view of a locking clutch spring assembly of the parking brake actuator of FIG. 1, shown fully assembled.

FIG. 4 is a perspective view of an adjusting clutch spring assembly of the parking brake actuator of FIG. 1, shown partially assembled.

Figure 1:
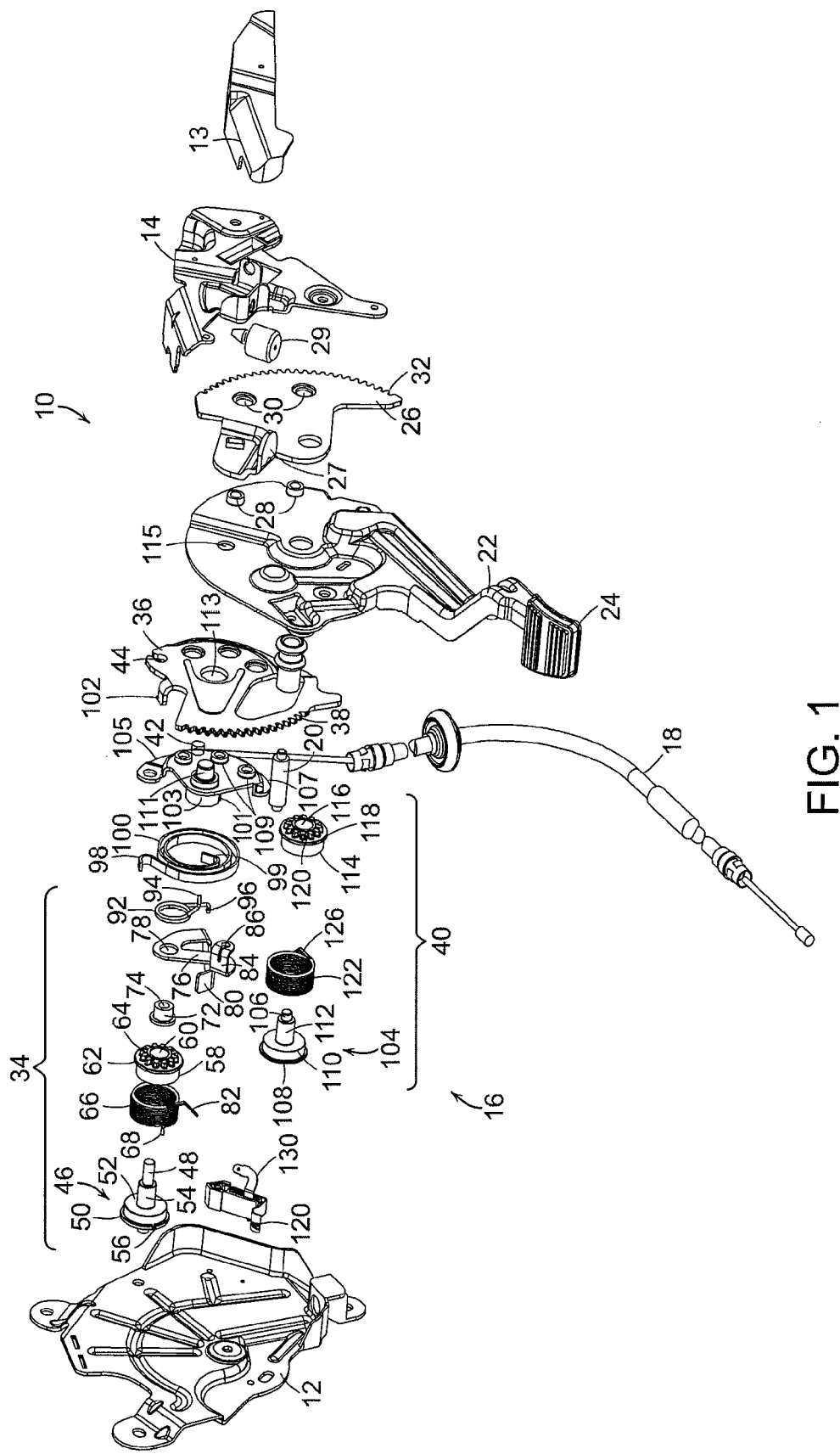
FIG. 1 is a perspective view in exploded form of a parking brake actuator for a motor vehicle.

The figures referred to above are not drawn necessarily to scale and should be understood to provide a representation of the invention, illustrative of the principles involved. Some features of the parking brake actuator depicted in the drawings have been enlarged or distorted relative to others to facilitate explanation and understanding. The same reference numbers are used in the drawings for similar or identical components and features shown in various alternative embodiments. Parking brake actuators as disclosed herein would have configurations and components determined, in part, by the intended application and environment in which they are used.

DETAILED DESCRIPTION OF CERTAIN PREFERRED EMBODIMENTS

The present invention may be embodied in various forms. An embodiment of a parking brake actuator 10 is shown in FIG. 1 and includes a mounting bracket 12 and a cover plate 14. A shield 13 is positioned adjacent cover plate 14 and acts to protect electrical components. A brake operating assembly 16 acts to variably tension a parking brake cable 18 and is pivotal about a pin 20 that extends between mounting bracket 12 and cover plate 14. Brake operating assembly 16 includes a lever 22 pivotable about pin 20 and having a pedal 24 secured thereto. Lever 22 is actuated when a driver depresses pedal 24.

Brake operating assembly 16 includes a locking sector gear 26 that rotates about pin 20 with lever 22 and is rotationally fixed with respect to lever 22 by extrudes 28 on lever 22 that are received in apertures 30 formed in locking sector gear 26. As illustrated here, locking sector gear 26 is a plate having a plurality of teeth 32. Locking sector gear 26 cooperates with a locking clutch spring assembly 34 in known fashion to releasably lock lever 22 in its brake-engaged position. Locking sector gear 26 has a tab 27 that engages a bumper 29 when lever 22 is in its brake-disengaged position.

An adjusting sector gear 36, which is illustrated here as a plate, has a plurality of teeth 38. A first end 42 of cable 18 is received in a retaining slot 44 formed in adjusting sector gear 36. The other end of cable 18 is secured in known fashion to the parking brake. Adjusting sector gear 36 cooperates in known fashion with an adjusting clutch spring assembly 40 to automatically maintain proper tension in parking brake cable 18 as described in greater detail below.

Locking clutch spring assembly 34 includes a pinion rivet 46 having a shaft 48, a flange 50, a first tubular portion 52 adjacent flange 50 and a second tubular portion 54 adjacent first tubular portion 52. Second tubular portion 54 has a diameter smaller than the diameter of first tubular portion 52. A notch 56 is formed in flange 50.

A pinion 58 has an aperture 60 extending therethrough that receives second tubular portion 54 of pinion rivet 46. Pinion 58 has a diameter that is substantially the same as the diameter of first tubular portion 52 and is in an abutting relationship with first tubular portion 52 when they are assembled, as seen in FIG. 2. Pinion 58 includes a flange 62 and a plurality of teeth 64 on a surface of flange 62. Teeth 64 engage teeth 32 of locking sector gear 26 as described in greater detail below.

A torsion clutch spring 66 is seated on first tubular portion 52 and pinion 58, between flange 50 of pinion rivet 46 and flange 62 of pinion 58, as seen in FIG. 3. A first leg 68 at a first end 70 of torsion clutch spring 66 is seated in notch 56 in flange 50, fixing first end 70 of torsion clutch spring 66 with respect to pinion rivet 46.

A bushing 72 having a central aperture 74 is seated on shaft 48 adjacent pinion 58. A release lever 76 has an aperture 78 extending therethrough that receives bushing 72 such that release lever 76 is seated on bushing 72. A first arm 80 of release lever 76 is in abutting engagement with a second leg 82 of torsion clutch spring 66. A second arm 84 of release lever 76 has an aperture, seen here as a slot 86, formed therein that receives a first end 88 of a release cable 90. A release spring 92 is seated on shaft 48 adjacent to and in abutting relationship with release lever 76. Release spring 92 has a first leg 94 at a first end thereof that is connected to cover plate 14 and a second leg 96 at a second end thereof in abutting relationship with second arm 84 of release lever 76. Release spring 92 helps to maintain tension in release cable 90, helps reduce rattling when there is reduced tension in release cable 90, and brings release lever 76 back to its home position after release cable 90 is released.

A first end 98 of a clock spring 100 engages a tab 102 formed on adjusting sector gear 36, and acts to take up slack in cable 18 when brake operating assembly 16 is in a disengaged, non-braking condition. A second end 99 of clock spring 100 is seated in a groove 101 formed in a hub 103 of a cable track 105. Cable track 105 has a cam surface 107 along which cable 18 rides. Cable track 105 is secured to adjusting sector gear 36 by rivets 109. A pin 111 extends from cable track 105, extends through an aperture 113 in adjusting sector gear 36 and is received in an aperture 115 formed in lever 22.

Adjusting clutch spring assembly 40 includes a pinion rivet 104 having a shaft 106, a flange 108, a first tubular portion 110 adjacent flange 108 and a second tubular portion 112 adjacent first tubular portion 110. Second tubular portion 112 has a diameter smaller than the diameter of first tubular portion 110. A notch 113, seen in FIG. 4, is formed in flange 108.

A pinion 114 has an aperture 116 extending therethrough that receives second tubular portion 112 of pinion rivet 104. Pinion 114 has a diameter that is substantially the same as the diameter of first tubular portion 110 and is in abutting relationship with first tubular portion 110 when they are assembled, as seen in FIG. 4. Pinion 114 includes a flange 118 and a plurality of teeth 120 on a surface of flange 118. Teeth 120 engage teeth 38 of adjusting sector gear 36 as described in greater detail below.

A torsion clutch spring 122 is seated on first tubular portion 110 and pinion 114, between flange 108 of pinion rivet 104 and flange 118 of pinion 114, as seen in FIG. 3. A first leg 124 at a first end of torsion clutch spring 122 (not visible in FIG. 1) is seated in notch 113 in flange 108, fixing torsion clutch spring 122 with respect to pinion rivet 104. A second leg 126 of torsion clutch spring 122 is engageable with lever 22 during operation of brake operating assembly 16.

A light switch 128 is engageable by lever 22 when the parking brake is actuated, allowing a signal to be sent to an indicator light in the passenger compartment of the vehicle indicating to the driver that the brake is activated. An electrical connection 130 is formed on light switch 128, and a cable from the indicator light can be connected to electrical connection 130.

In operation, a user depresses pedal 24 and, therefore, lever 22 to actuate the parking brake. As lever 22 moves, lever 22 engages second leg 126 of torsion clutch spring 122 causing the coils of torsion clutch spring 122 to engage pinion 114 and pinion rivet 104. Teeth 120 on pinion 114 engage with teeth 38 of adjusting sector gear 36. As lever 22 is further depressed adjusting sector gear rotates about pin 111 in a counterclockwise direction as seen in FIG. 1, causing the end of cable 18 to move upwardly, increasing tension in cable 18 and applying the parking brake.

As lever 22 moves, locking sector gear 26 also rotates with lever 22 in a counterclockwise direction as seen in FIG. 1. Teeth 32 of locking sector gear 26 engage teeth 64 of pinion 58, causing pinion 58 to rotate in a clockwise direction as seen in FIG. 1. As pinion 58 rotates it tends to unwind torsion clutch spring 66 against the frictional force of the spring since the torque created on lever 22 by the depression of pedal 24 by the user's foot is greater than the friction created by the spring.

Once the user has depressed pedal 24 a desired amount and released pressure from pedal 24, the coils of torsion clutch spring 66 engage pinion 58 and first tubular portion 52 of pinion rivet 46, preventing further rotation of locking sector gear 26, thereby lever 24 in its engaged position.

To release the parking brake, a user pulls on release cable 90, rotating release lever 76, in a clockwise direction as seen in FIG. 1. As release lever 76 rotates, first leg 58 of release lever 76 engages second leg 82 of torsion clutch spring 66, releasing the tension of torsion clutch spring 66 and allowing pinion 58, locking sector gear 26 and lever 22 to return to the home non-braking position. Release spring 92 helps bring release lever 76 back to its static home position.

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

What is claimed is:

1. A motor vehicle parking brake actuator comprising, in combination:
    a mounting bracket;
    a cover plate;
    a brake operating assembly positioned between the mounting bracket and cover plate and comprising:
        a lever;
        a locking sector gear rotatably secured to the lever;
        a first clutch spring assembly engageable with the locking sector gear comprising:
            a pinion rivet comprising
                a shaft;
                a flange on the shaft;
                a first tubular portion adjacent the flange;
                a second tubular portion adjacent the first tubular portion and having a diameter smaller than a diameter of the first tubular portion;
            a pinion having an aperture formed therein and seated on the second tubular portion of the pinion rivet in abutting relationship with the first tubular portion of the pinion rivet;
            a plurality of teeth on the pinion;
            a torsion spring wrapped about the first tubular portion and the pinion;
        a release lever having a first arm, a second arm and an aperture extending therethrough, the aperture receiving a portion of the shaft of the pinion rivet; and
        a release spring having a first leg and a second leg and positioned about the shaft of the pinion rivet, the first leg abutting the first arm of the release lever and the second leg connected to the cover plate;
    a release cable connected to the second arm of the release lever;
    an adjusting sector gear connected to the lever;
    a brake cable connected at one end thereof to the adjusting sector gear; and
    an adjusting clutch spring assembly engageable with the adjusting sector gear.

2. The motor vehicle parking brake actuator of claim 1, wherein the adjusting clutch spring assembly comprises:
    a pinion rivet comprising
        a shaft;
        a flange on the shaft;
        a first tubular portion adjacent the flange;
        a second tubular portion adjacent the first tubular portion and having a diameter smaller than a diameter of the first tubular portion;
    a pinion having an aperture formed therein and seated on the second tubular portion of the pinion rivet in abutting relationship with the first tubular portion of the pinion rivet;
    a plurality of teeth on the pinion engageable with the adjusting sector gear; and
    a torsion spring wrapped about the first tubular portion and the pinion.

3. The motor vehicle parking brake actuator of claim 2, wherein the adjusting sector gear includes a plurality of teeth engageable with the teeth of the pinion of the adjusting clutch spring assembly.

4. The motor vehicle parking brake actuator of claim 1, wherein the locking sector gear includes a plurality of teeth engageable with the teeth of the pinion of the locking clutch spring assembly.

5. The motor vehicle parking brake actuator of claim 1, wherein the adjusting sector gear includes a slot, an end of the brake cable being received in the slot.

6. The motor vehicle parking brake actuator of claim 1, wherein the lever includes a pedal.

7. The motor vehicle parking brake actuator of claim 1, further comprising a cable track secured to the adjusting sector gear and having a camming surface, the brake cable riding along the camming surface.

8. The motor vehicle parking brake actuator of claim 7, further comprising a clock spring, a first end of the clock spring engageable with a tab formed on the adjusting sector gear and a second end of the clock spring connected to the cable track.

9. The motor vehicle parking brake actuator of claim 1, further comprising a light switch engageable with the lever.

10. A motor vehicle parking brake actuator comprising, in combination:
    a mounting bracket;
    a cover plate;
    a pin extending between the mounting bracket and the cover plate;
    a brake operating assembly pivotable about the pin between the mounting bracket and cover plate and comprising:
        a lever;
        a locking sector gear rotatably secured to the lever;

a first clutch spring assembly engageable with the locking sector gear comprising:
  a pinion rivet comprising
    a shaft;
    a flange on the shaft;
    a first tubular portion adjacent the flange;
    a second tubular portion adjacent the first tubular portion and having a diameter smaller than a diameter of the first tubular portion;
  a pinion having an aperture formed therein and seated on the second tubular portion of the pinion rivet in abutting relationship with the first tubular portion of the pinion rivet;
  a plurality of teeth on the pinion;
  a torsion spring wrapped about the first tubular portion and the pinion;
  a release lever having a first arm, a second arm and an aperture extending therethrough, the aperture receiving a portion of the shaft of the pinion rivet; and
  a release spring having a first leg and a second leg and positioned about the shaft of the pinion rivet, the first leg abutting the first arm of the release lever and the second leg connected to the cover plate;
a release cable connected to the second arm of the release lever;
an adjusting sector gear connected to the lever;
a brake cable connected at one end thereof to the adjusting sector gear;
a cable track secured to the adjusting sector gear and having a camming surface, the brake cable riding along the camming surface; and
an adjusting clutch spring assembly engageable with the adjusting sector gear.

11. The motor vehicle parking brake actuator of claim 10, wherein the adjusting clutch spring assembly comprises:
  a pinion rivet comprising
    a shaft;
    a flange on the shaft;
    a first tubular portion adjacent the flange;
    a second tubular portion adjacent the first tubular portion and having a diameter smaller than a diameter of the first tubular portion;
  a pinion having an aperture formed therein and seated on the second tubular portion of the pinion rivet in abutting relationship with the first tubular portion of the pinion rivet;
  a plurality of teeth on the pinion engageable with the adjusting sector gear; and
  a torsion spring wrapped about the first tubular portion and the pinion.

12. The motor vehicle parking brake actuator of claim 11, wherein the adjusting sector gear includes a plurality of teeth engageable with the teeth of the pinion of the adjusting clutch spring assembly.

13. The motor vehicle parking brake actuator of claim 10, wherein the locking sector gear includes a plurality of teeth engageable with the teeth of the pinion of the locking clutch spring assembly.

14. The motor vehicle parking brake actuator of claim 10, further comprising a clock spring having a first end engageable with the adjusting sector gear and a second end engaged with the cable track.

15. The motor vehicle parking brake actuator of claim 10, wherein the adjusting sector gear includes a slot, an end of the brake cable being received in the slot.

16. The motor vehicle parking brake actuator of claim 10, further comprising a light switch engageable with the lever.

17. A motor vehicle parking brake actuator comprising, in combination:
  a mounting bracket;
  a cover plate;
  a pin extending between the mounting bracket and the cover plate
  a brake operating assembly positioned between the mounting bracket and cover plate and comprising:
    a lever including a pedal;
    a locking sector gear rotatably secured to the lever and having a plurality of teeth;
    a first clutch spring assembly engageable with the locking sector gear comprising:
      a pinion rivet comprising
        a shaft;
        a flange on the shaft;
        a first tubular portion adjacent the flange;
        a second tubular portion adjacent the first tubular portion and having a diameter smaller than a diameter of the first tubular portion;
      a pinion having an aperture formed therein and seated on the second tubular portion of the pinion rivet in abutting relationship with the first tubular portion of the pinion rivet;
      a plurality of teeth on the pinion engageable with the teeth of the locking sector gear;
      a torsion spring wrapped about the first tubular portion and the pinion;
      a release lever having a first arm, a second arm and an aperture extending therethrough, the aperture receiving a portion of the shaft of the pinion rivet; and
      a release spring having a first leg and a second leg and positioned about the shaft of the pinion rivet, the first leg abutting the first arm of the release lever and the second leg connected to the cover plate;
    a release cable connected to the second arm of the release lever;
    an adjusting sector gear connected to the lever and having a slot formed therein, a tab, and a plurality of teeth;
    a brake cable, a first end of the brake cable received in the slot in the adjusting sector gear;
    a cable track secured to the adjusting sector gear and having a camming surface, the brake cable riding along the camming surface;
    a clock spring having a first end engageable with the tab on the adjusting sector gear and a second end engaged with the cable track; and
    an adjusting clutch spring assembly engageable with the adjusting sector gear and comprising:
      a pinion rivet comprising
        a shaft;
        a flange on the shaft;
        a first tubular portion adjacent the flange;
        a second tubular portion adjacent the first tubular portion and having a diameter smaller than a diameter of the first tubular portion;
      a pinion having an aperture formed therein and seated on the second tubular portion of the pinion rivet in abutting relationship with the first tubular portion of the pinion rivet;
      a plurality of teeth on the pinion engageable with the teeth of the adjusting sector gear; and
      a torsion spring wrapped about the first tubular portion and the pinion.

* * * * *